(12) United States Patent  (10) Patent No.: US 7,412,374 B1
Seiler et al.  (45) Date of Patent: Aug. 12, 2008

(54) METHOD TO DYNAMICALLY DETERMINE A USER'S LANGUAGE FOR A NETWORK

(75) Inventors: Christopher Jean Seiler, Pleasant Grove, UT (US); Matthew Gerrit Brooks, Orem, UT (US); Olin Sayre Atkinson, Orem, UT (US); James Mark Norman, Pleasant Grove, UT (US); Boyd "H" Timothy, Provo, UT (US); Timothy Paul Schmanski, Lindon, UT (US)

(73) Assignee: Novell, Inc., Provo, UT (US)

( * ) Notice: Subject to any disclaimer, the term of this patent is extended or adjusted under 35 U.S.C. 154(b) by 756 days.

(21) Appl. No.: 10/066,368

(22) Filed: Jan. 30, 2002

(51) Int. Cl.
 *G06F 17/20* (2006.01)
 *G06F 17/28* (2006.01)

(52) U.S. Cl. .............................. 704/8; 704/7

(58) Field of Classification Search .................. 704/1, 704/8, 9, 7
See application file for complete search history.

(56) References Cited

U.S. PATENT DOCUMENTS

| | | |
|---|---|---|
| 5,717,923 A | 2/1998 | Dedrick |
| 5,983,227 A | 11/1999 | Nazem et al. |
| 6,029,245 A | 2/2000 | Scanlan |
| 6,061,684 A | 5/2000 | Glasser et al. |
| 6,202,066 B1 | 3/2001 | Barkley et al. |
| 6,209,036 B1 | 3/2001 | Aldred et al. |
| 6,209,124 B1 | 3/2001 | Vermeire et al. |
| 6,240,170 B1 * | 5/2001 | Shaffer et al. .......... 379/142.15 |
| 6,243,717 B1 * | 6/2001 | Gordon et al. .............. 707/203 |
| 6,286,001 B1 | 9/2001 | Walker et al. |
| 6,311,180 B1 * | 10/2001 | Fogarty ......................... 707/4 |
| 6,327,628 B1 | 12/2001 | Anuff et al. |
| 6,381,579 B1 | 4/2002 | Gervais et al. |
| 6,389,589 B1 | 5/2002 | Mishra et al. |
| 6,408,336 B1 | 6/2002 | Schneider et al. |
| 6,415,250 B1 * | 7/2002 | van den Akker ............... 704/9 |
| 6,499,030 B1 * | 12/2002 | Igata ............................. 707/6 |
| 6,529,910 B1 | 3/2003 | Fleskes |
| 6,560,639 B1 | 5/2003 | Dan et al. |
| 6,571,241 B1 * | 5/2003 | Nosohara ....................... 707/6 |
| 6,623,529 B1 * | 9/2003 | Lakritz ....................... 715/536 |
| 6,633,742 B1 * | 10/2003 | Turner et al. ................ 434/350 |

(Continued)

FOREIGN PATENT DOCUMENTS

EP 0 975 128 1/2000

(Continued)

OTHER PUBLICATIONS

Sumner Blount, "Secure Portal Management", eAI Journal, May 2000, pp. 44, 46, 48, & 49.

(Continued)

*Primary Examiner*—Tālivaldis Ivars Šmits
(74) *Attorney, Agent, or Firm*—Marger Johnson & McCollom PC

(57) ABSTRACT

A portal system identifies a language in which content can be displayed to the user. Possible languages can be determined from one or more of identity information for the user, a container for the user's directory entry, and the user's location. The determined languages can be ranked, and the highest-ranked available language can be selected for content display to the user.

24 Claims, 7 Drawing Sheets

U.S. PATENT DOCUMENTS

| | | | |
|---|---|---|---|
| 6,704,024 B2 | 3/2004 | Robotham et al. | |
| 6,738,950 B1 | 5/2004 | Barnett | |
| 6,772,146 B2 | 8/2004 | Khemlani et al. | |
| 6,784,883 B1 | 8/2004 | Allor | |
| 6,785,728 B1 | 8/2004 | Schneider et al. | |
| 6,789,231 B1* | 9/2004 | Reynar et al. | 715/533 |
| 6,871,197 B1 | 3/2005 | Johnson | |
| 6,925,595 B1 | 8/2005 | Whitledge et al. | |
| 6,925,598 B2 | 8/2005 | Melhem et al. | |
| 6,965,914 B2 | 11/2005 | Dowling | |
| 6,975,619 B1* | 12/2005 | Byers et al. | 370/351 |
| 6,993,554 B2 | 1/2006 | O'Donnell | |
| 7,085,834 B2 | 8/2006 | Delany et al. | |
| 2001/0037192 A1* | 11/2001 | Shimamoto et al. | 704/8 |
| 2002/0002557 A1 | 1/2002 | Straube et al. | |
| 2002/0052954 A1 | 5/2002 | Polizzi et al. | |
| 2002/0069081 A1* | 6/2002 | Ingram et al. | 705/1 |
| 2002/0103778 A1 | 8/2002 | Saxena | |
| 2002/0120538 A1 | 8/2002 | Corrie et al. | |
| 2002/0129001 A1* | 9/2002 | Levkoff et al. | 707/1 |
| 2002/0129052 A1 | 9/2002 | Glazer et al. | |
| 2002/0138331 A1 | 9/2002 | Hosea et al. | |
| 2002/0147790 A1* | 10/2002 | Snow | 709/217 |
| 2002/0147801 A1 | 10/2002 | Gullotta et al. | |
| 2002/0156902 A1* | 10/2002 | Crandall | 709/228 |
| 2002/0174196 A1* | 11/2002 | Donohoe et al. | 709/219 |
| 2002/0198971 A1* | 12/2002 | Resnick et al. | 709/221 |
| 2003/0005002 A1 | 1/2003 | Chen et al. | |
| 2003/0050986 A1 | 3/2003 | Matthews et al. | |
| 2003/0061216 A1 | 3/2003 | Moses | |
| 2003/0110272 A1 | 6/2003 | du Castel et al. | |
| 2003/0158897 A1 | 8/2003 | Ben-Natan et al. | |
| 2003/0163517 A1 | 8/2003 | Assaf et al. | |
| 2003/0191817 A1* | 10/2003 | Fidler | 709/219 |
| 2003/0195923 A1 | 10/2003 | Bloch et al. | |
| 2004/0123238 A1 | 6/2004 | Hefetz et al. | |
| 2004/0193699 A1 | 9/2004 | Heymann et al. | |
| 2004/0199603 A1 | 10/2004 | Tafla et al. | |
| 2004/0205118 A1* | 10/2004 | Yu | 709/203 |
| 2004/0205572 A1 | 10/2004 | Fields et al. | |
| 2005/0097008 A1 | 5/2005 | Ehring et al. | |
| 2005/0097190 A1 | 5/2005 | Abdelhak | |
| 2005/0188318 A1 | 8/2005 | Tamir et al. | |
| 2006/0004763 A1 | 1/2006 | Horvitz et al. | |
| 2006/0010390 A1 | 1/2006 | Guido et al. | |

FOREIGN PATENT DOCUMENTS

| | | |
|---|---|---|
| WO | 9820434 | 5/1998 |

OTHER PUBLICATIONS

Bob King, "All Together Now", Internet World, Sep. 15, 2000, pp. 38-39.

"Portal Building Guide", Yahoo! PortalBuilder TM, Nov. 2001, Software Release 3.5.0.

* cited by examiner

METHOD TO DYNAMICALLY DETERMINE A USER'S LANGUAGE FOR A NETWORK

RELATED APPLICATION DATA

This application is related to U.S. patent application Ser. No. 10/066,465, titled 'Method and Apparatus to Dynamically Provide Web Content Resources in an Internet Portal,' filed Jan. 30, 2002.

FIELD OF THE INVENTION

This invention pertains to network access, and more particularly to accessing content over a network in a user's preferred language.

BACKGROUND OF THE INVENTION

The Internet has become a resource of incredible power for many people. The ability to locate information on almost any subject, simply by using a computer, has made possible whole new avenues of research. Users can locate information on their subject of choice almost as simple as asking a question.

But language issues complicate the use of the Internet. Although English is currently the dominant language of the Internet, it is by no means the only language available. Content pages exist in just about every written language on the face of the planet.

Since few people can read every written language, different language versions of content pages can be provided. For example, a person who is comfortable communicating in English can view a content page written in English, whereas a Japanese native can view a content page prepared in Japanese.

The original way users specified the language in which they viewed material was by knowing the uniform resource locator (URL) of the content site written in that language. For example, if a site provided a content page in both English and Japanese formats, the user had to know the URL of the English content page to view the page in English, or the URL of the Japanese content page to view the page in Japanese.

FIG. 1 shows a prior art system for accessing information in a preferred language. In FIG. 1, a user is using computer system 105 to access network 110. Computer system 105 includes the standard components of a computer system: computer (including a processor, memory, etc.), monitor, keyboard, and mouse, but a person skilled in the art will recognize other variations that can be substituted for computer system 105 (e.g., a dumb terminal). Across network 110 is server 115, storing content page 120. When the user enters the URL of content page 120 into address field 125 of browser 130, the content page is shown in browser 130 (displayed on the monitor of computer system 105). Note that in FIG. 1, the user has entered http://www.website.com/webpage_EN.html as the content page. The use of '_EN' as part of the URL lets the user know that the content page is written in English. If the user wanted to see the content page in Japanese, the user could enter http://www.website.com/webpage_JP.html instead ('_JP' specifying the Japanese-language version of the content page). (There is no required format for the names for content pages: these are merely exemplary.)

But there is a significant handicap to the approach of having the user specify by URL the preferred language for display in the browser. If the user does not know the correct URL, the user cannot see the material in the preferred language.

More recently, browsers have added the capability to specify a preferred language as a setting for the browser. The user then only needs to know the URL for the main content page. Processing the URL by the browser includes sending the preferred language to the web site (as shown by arrow 135). This information is included in the header of a packet sent from the browser to the web site. Then, it becomes the responsibility of the web site to process the header information, determine the preferred language, and display the content page in the preferred language (assuming the web site includes the content page in the preferred language).

But still problems remain. Problems lie in defining the user's preferred language. Although the user does not need to specify for each content page the preferred language for display of the content page, the user still has to set the browser up to know the preferred language. This requires a manual step by the user on his computer. Further, every time the user changes computers, the browser on the new computer must be configured to know the preferred language. Finally, if the user uses a computer that is not dedicated to him (for example, the user works on a locally public machine or on machines dedicated primarily to other users), changing the preferred language would affect other users, perhaps to their displeasure (if the other users prefer a different language).

Problems also exist in displaying content to the user in the desired language. The earlier-described technique of assembling a content page with a unique URL for each different language is a straightforward solution, but has flaws. First, someone must craft a version of the content page in each possible language. The straightforward approach typically involves generating a master version of the content page in one language (e.g., English) and then translating the master version into all of the target languages. Given the number of languages that exist and the complexity of accurate translation of documents, this is by no means a simple task.

Second, when the content on the master version of the content page changes, the content on each of the translated versions must be changed to match. Again, given the number of languages and the complexity of accurate translation, this can be costly.

Third, a file naming convention, consistent across the entire network, is required. The user must know this naming convention, and must modify the URL of the content page to reflect the desired language. Conceivably, the task of modifying the URL can be shifted to the browser, but then the browser must be given specialized knowledge to know when not to modify a URL (e.g., when the user wishes to view a content page in a language other than the default). If the content provider does not conform to the file naming convention, then the user will not be able to access the content. In addition, if the content provider does not provide the content page in the language specified by the user, the user will be told that the content page does not exist, when it might exist in another language.

Accordingly, a need remains for a way to identify a user's preferred language without having to manually set a preferred language in a browser on a computer, and without the user having to specify language-specific content pages, to address these and other problems associated with the prior art.

SUMMARY OF THE INVENTION

An embodiment of the invention is a method and apparatus for identifying a user's preferred language. When a user logs into a computer, a directory entry is checked to see if the user's identity information includes a preferred language. A preferred language can also be inherited from a container of the user's directory entry, for example, if the user has not specified a preferred language. A preferred language can also be identified from the user's location. If there are multiple preferred languages, they can be ranked, and the highest ranked language selected.

The foregoing and other features, objects, and advantages of the invention will become more readily apparent from the following detailed description, which proceeds with reference to the accompanying drawings.

DETAILED DESCRIPTION

Figure 1:
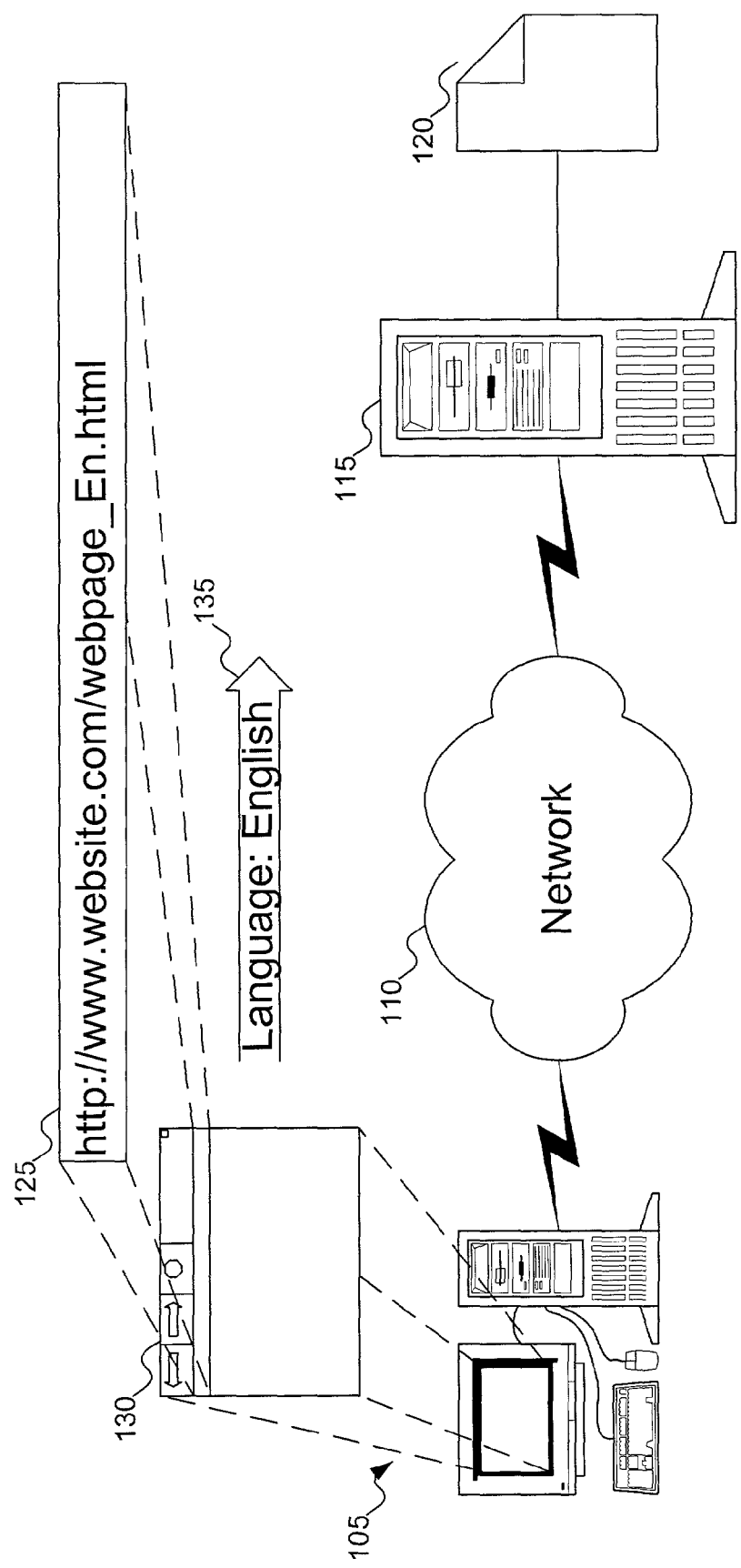
FIG. 1 shows a prior art system for accessing information in a preferred language.
Figure 2:
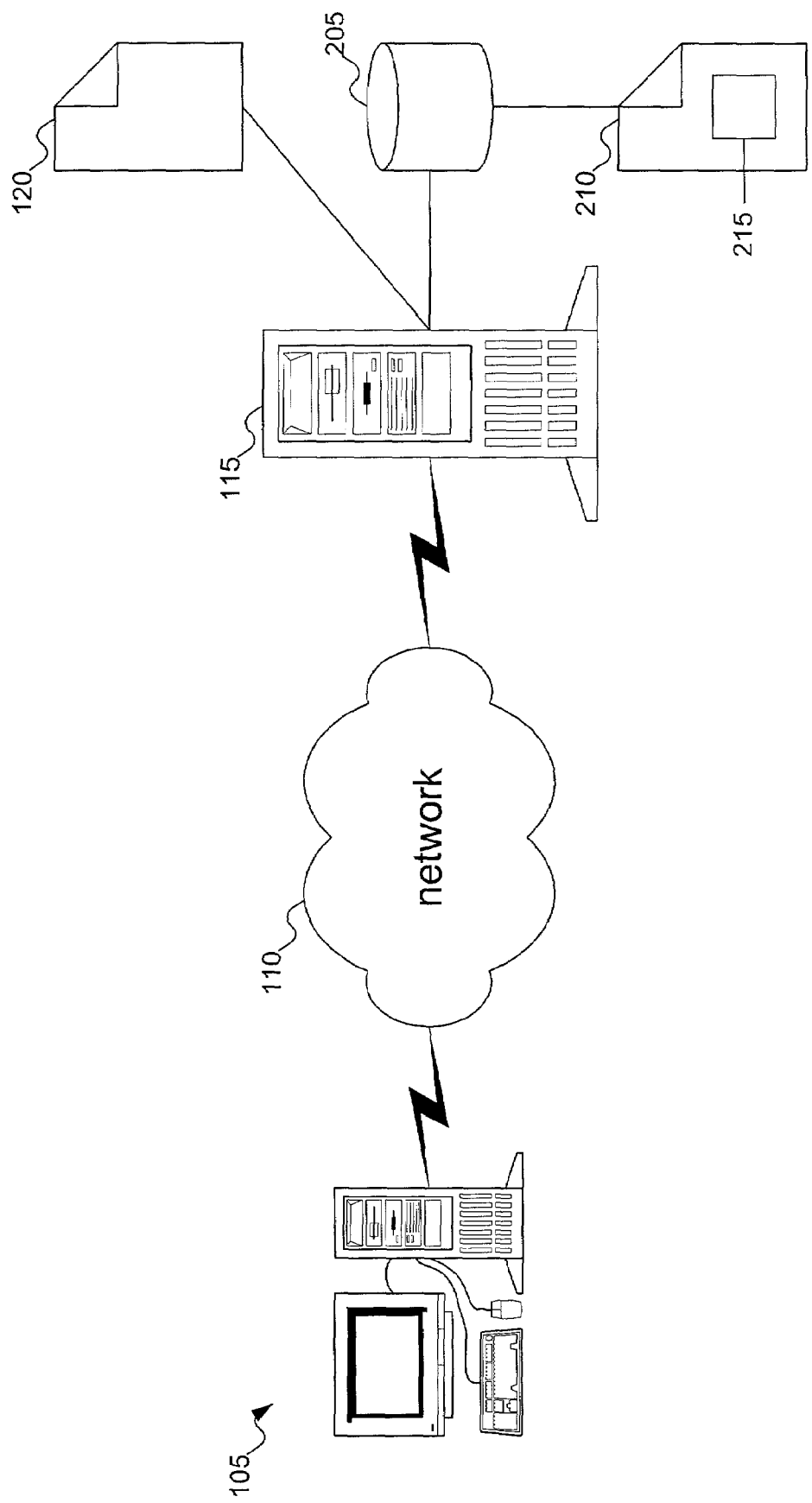
FIG. 2 shows a system for identifying a user's preferred language from a directory entry according to an embodiment of the invention.

FIG. 2 shows a system for identifying a user's preferred language from a directory entry according to an embodiment of the invention. In FIG. 2, server 115 contains database 205. Database 205 stores directory entries for users, such as directory entry 210. Directory entry 210 stores information about a user, such as authentication information used to log the user in to server 115.

Directory entry 210 includes identity information 215. Identity information 215 stores information identifying the user. One piece of information stored in identity information is a preferred language. When the user logs in and is authenticated by server 115, the preferred language can be read from identity information 215. The preferred language can then be used to build a ranked list of languages, or sent to other web sites in the header of a packet as the user searches the network for content.

The user gets the benefit of content displayed in a preferred language, without having to specify anywhere (e.g., as a browser setting or in a uniform resource locator (URL)) the preferred language. Instead, the preferred language can be read from identity information 215 when the user logs in to computer 115.

Note that in FIG. 2, server 115 is shown as supporting both directory entry 210 (along with identity information 215), as well as content page 120. But a person skilled in the art will recognize that authentication and content provision can be separated to different servers. Indeed, typically the portal server will provide access to content provided by other content providers, few (if any) of which will be stored on the server performing the authentication.

Although identity information 215 can store the user's preferred language, the preferred language is not a required element of the identity information. If the identity information does not include a preferred language, the preferred language can be inherited from a container object storing the user's directory entry. This is explained in greater detail with reference to FIG. 3, where the user's directory entry is part of a container hierarchy.

Figure 3:
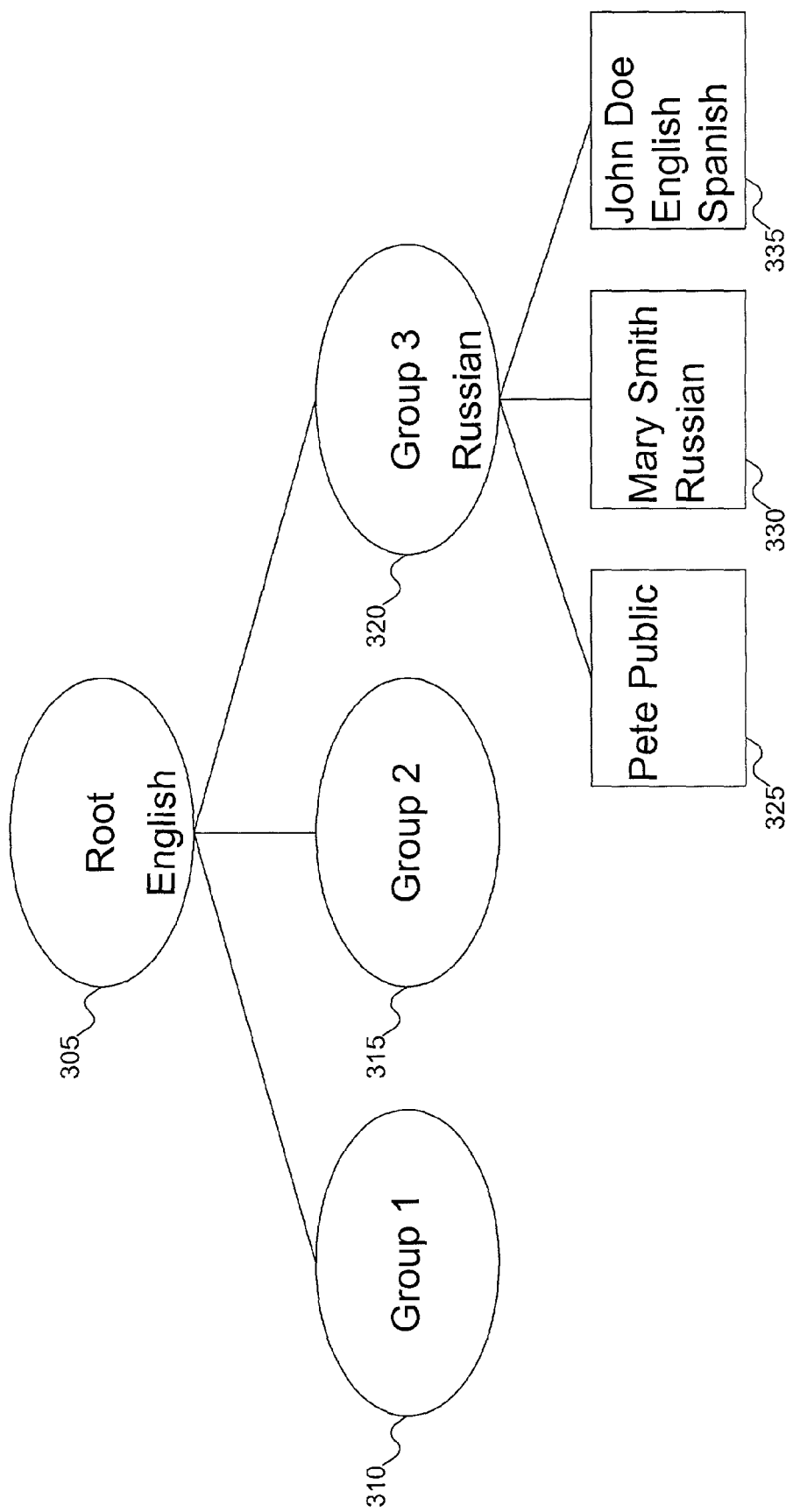
FIG. 3 shows a container hierarchy for the user's directory entry of FIG. 2, according to an embodiment of the invention.

In FIG. 3, root 305 is the root of a container hierarchy. There are three containers below root 305: container 1 (310), container 2 (315), and container 3 (320). Each of containers 1 (310), 2 (315), and 3 (320) represent a group of employees, perhaps categorized by native language. For example, container 3 (320) includes directory entries for people who are native Russian speakers. A person skilled in the art will recognize that there are numerous variations on FIG. 3. For example, there can be fewer or more than three containers below root 305, the containers can reflect a different hierarchy than native language (such as group employment), there can be fewer or more than three employees within a container, etc.

Container 3 (320) is expanded, and shows directory entries for three individuals. Directory entry 325 is for Pete Public, directory entry 330 is for Mary Smith, and directory entry 335 is for John Doe. Because the directory entries for Pete Public, Mary Smith, and John Doe are all within container 3 (320), which has a default language of Russian, Pete Public, Mary Smith, and John Doe are presumed to be native Russian speakers. A person skilled in the art will recognize that the information presented within directory entries 325, 330, and 335 is partial, and show only information pertinent to an embodiment of the invention.

Directory entry 325 shows that Pete Public has not specified a preferred language. Pete Public inherits from the nearest higher-level container the associated default language. In this case, because container 3 (320) is the nearest higher-level container with a default language of Russian, Pete Public inherits a preferred language of Russian. Thus, an identifier for Russian is used by the portal server to provide content sent back to Pete's browser in Russian, when possible. Note that if container 3 (320) had not specified a default language, then English could be selected as the default language from root 305.

In contrast with Pete Public, directory entry 330 for Mary Smith specifies a preferred language of Russian. As described above with reference to FIG. 2, when a preferred language is found in the user's identity information, it is used by the portal server to provide content to the user in the preferred language. The fact that Mary inherits Russian as a default language from container 3 (320) does not prevent her from making explicit her preference for Russian.

Directory entry 335 for John Doe presents a different situation. John Doe has specified two preferred languages: English and Spanish. There are two points of interest relating to directory entry 335. First, directory entry 335 specifies more than one language. Since some users are multi-lingual, it is useful to allow the users to specify all the languages they are comfortable with. For example, consider the situation where a content page is available only in English and Japanese (specifically, the content page is not available in either Spanish or Russian). Clearly, in such a situation, John Doe would prefer the English version of the content page. Conversely, if the content page is available in Spanish but not English, the Spanish version of the content page is preferable over any other language.

Second, observe that John Doe has not listed Russian in directory entry 335. But because directory entry 335 is contained within container 3 (320), John Doe can inherit from container 3 (320) Russian as a preferred language. Whether language inheritance is permitted when a user has specified a preferred language is an implementation choice, but in an embodiment of the invention inheritance occurs even where the user has specified a language preference.

Although the above description refers to inheriting a language from the innermost container of the directory entry with a default language, a person skilled in the art will recognize that this can be generalized. For example, the user can inherit all languages between his directory entry and the root container. Thus, Pete Public 325 would inherit both Russian and English from containers of his directory entry as default languages.

Akin to inheritance is the possibility of an administrator setting a default language for all users of the portal system. Such an option can be thought of as a language assigned to root 305, although the implementation is different than assigning a language to root 305, and could apply across container hierarchies within the portal system. When an administrator sets a default language for the entire portal system, the default language is added to the list of languages for each user. This allows the default language to be ranked with other languages for the user.

Figure 4:
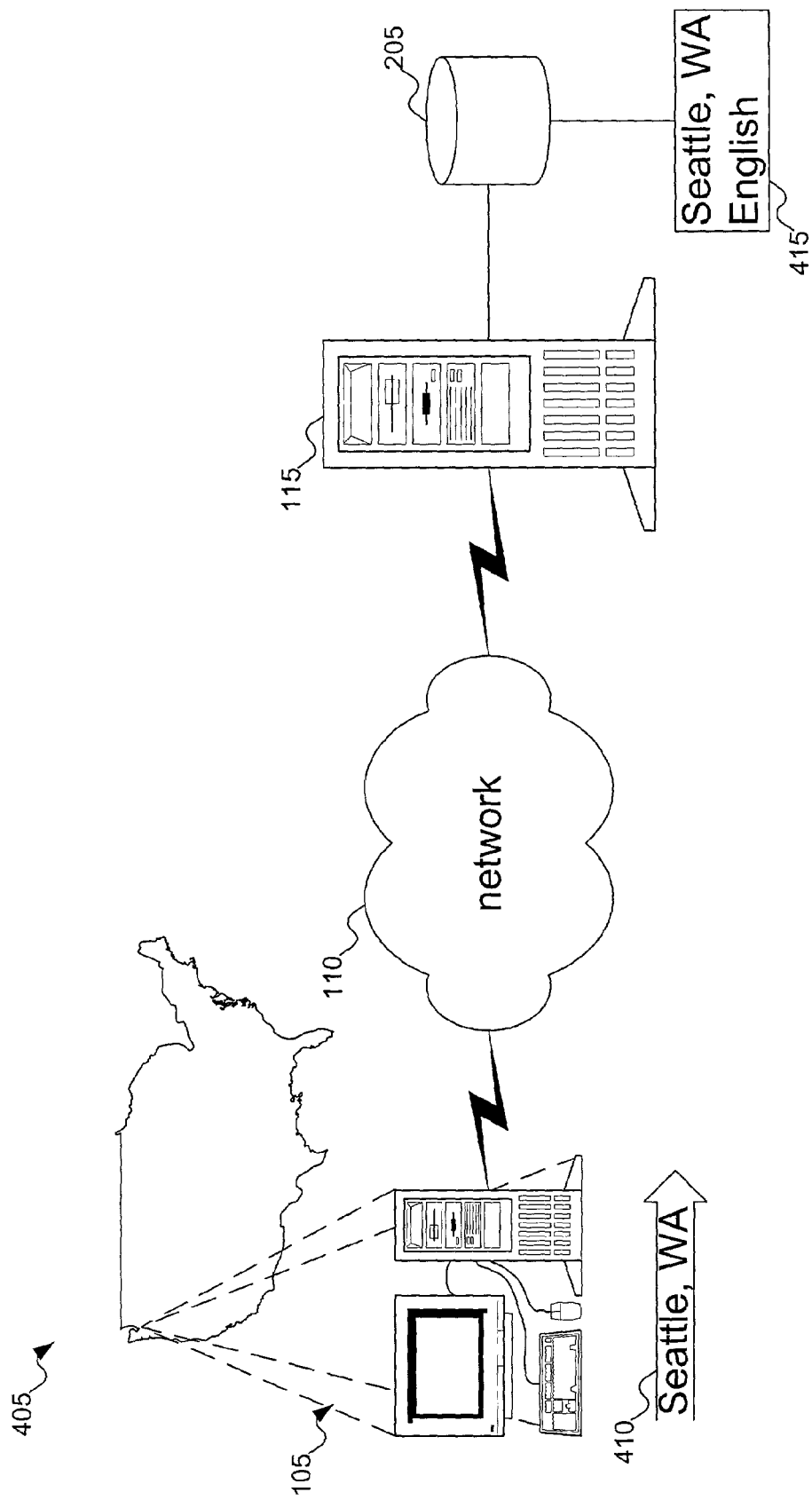
FIG. 4 shows the system of FIG. 2 wherein the user's location is used to identify a preferred language, according to an embodiment of the invention.

FIGS. 2 and 3 above describe two ways to automatically identify a language for use in displaying content to a user: specifically, by the user setting a preference and by inheritance from a container. As described above, the user's browser can also provide a language. (In fact, the user's browser can provide a list of languages, which can be used in constructing a ranked list of languages: see below with reference to FIG. 5.) Also as described above, an administrator can determine a portal language applicable to the entire portal system. A fifth way to determine a language for a user is based on geographic location. FIG. 4 shows the system of FIG. 2 wherein the user's location is used to identify a preferred language, according to an embodiment of the invention. In FIG. 4, map 405 of the United States of America is shown. The user is logging in from a Seattle, Wash., U.S.A. As shown by arrow 410, the user's location can be sent over network 110 to server 115. As part of the process of authenticating the user, database 205 can be checked to determine a default language for the user's location. In FIG. 4, as shown by entry 415, the default language for Seattle, Wash., U.S.A. is English. Thus, the user can be assigned a default language of English based on his location.

As discussed above with reference to FIG. 3, there is no limitation of only one default language for a location. A person skilled in the art will recognize that there can be multiple default languages. For example, if a particular office (say, Los Angeles, Calif., U.S.A.) contains a number of native Spanish speakers, the default languages can be both English and Spanish. In addition, a person skilled in the art will recognize that a default language based on location can be determined even if the user has specified a preferred language, inherited a language from a container, or both.

Figure 5:
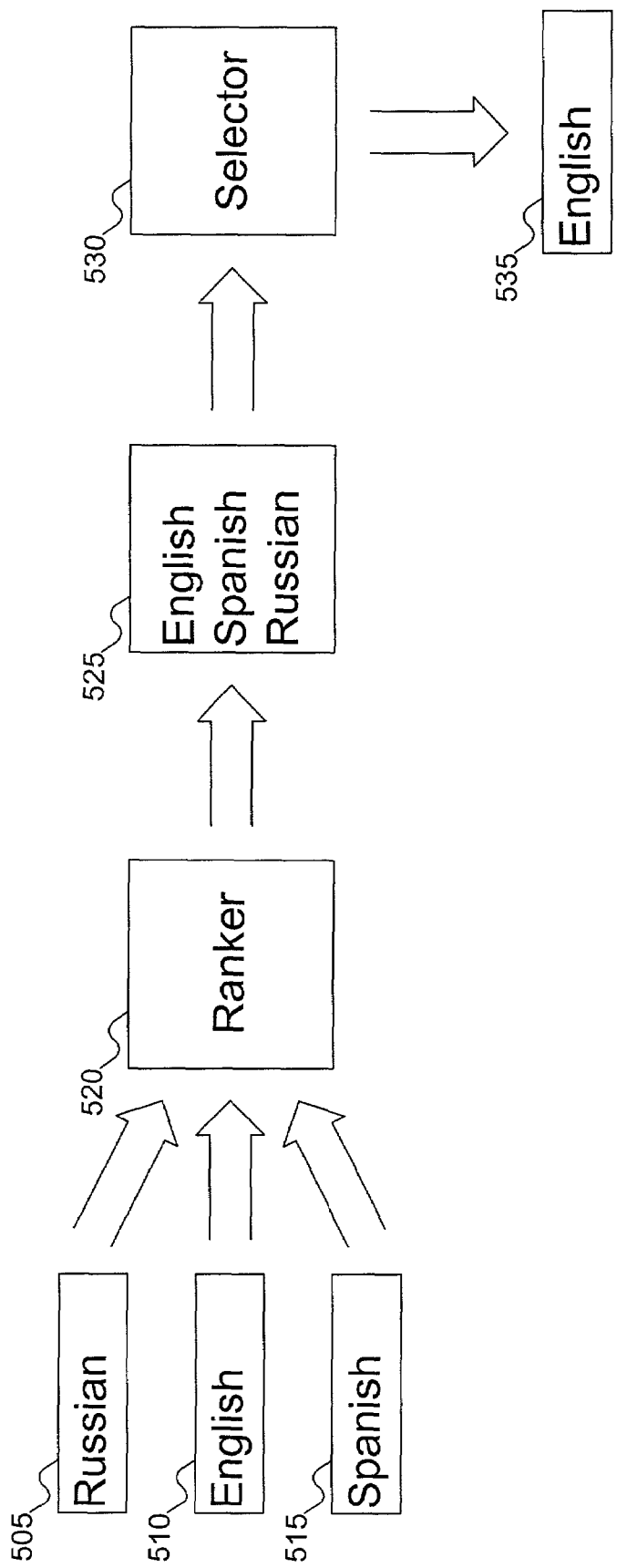
FIG. 5 shows multiple preferred languages from the systems of FIGS. 2-4 being ranked and selected, according to an embodiment of the invention.

But where the user has multiple preferred languages (derived from any or all of the user's identity information, container inheritance, location, or browser), the languages are preferably prioritized. FIG. 5 shows multiple preferred languages from the systems of FIGS. 2-4 being ranked and selected, according to an embodiment of the invention. In FIG. 5, three languages, Russian 505, English 510, and Spanish 515 are shown. But a person skilled in the art will recognize that there can be fewer or more than three languages. Ranker 520 takes the input languages and ranks them according to some prioritization scheme. For example, the user's preferred language(s) can be ranked first, then languages based on the user's location, and finally languages inherited from a container. A person skilled in the art will recognize that other prioritization schemes can be used.

Once the languages are ranked, a language can be selected in which to display content to the user. In FIG. 5, selector 530 takes ranked list of languages 525 and selects one language, in this case English 535. In one embodiment, selection is done once and applied to all content displayed to the user. In another embodiment, selection is done whenever new content is to be presented to the user. Once a language is selected, the content is then displayed in the language.

The reason selection can be done whenever new content is displayed to the user is that not all content is available in every language. For example, consider the selection of English 535 in FIG. 5. If the content chosen by the user is not available in English, it might be available in another language (e.g., Spanish). In that case, rather than informing the user that the content is not available in the user's highest ranked language, the content can be displayed in another preferred language.

Although languages for the user can be drawn from five different sources (the browser's list of preferred language, a user's directory entry, inheritance within the container hierarchy, location, and the portal system default language), not all of the sources have to be used to create the ranked list of languages. The administrator of the portal system can specify which of these sources can be used to construct the ranked list of languages. The administrator can also specify the order in which the sources are used to construct the ranked list of languages.

Figure 6A:
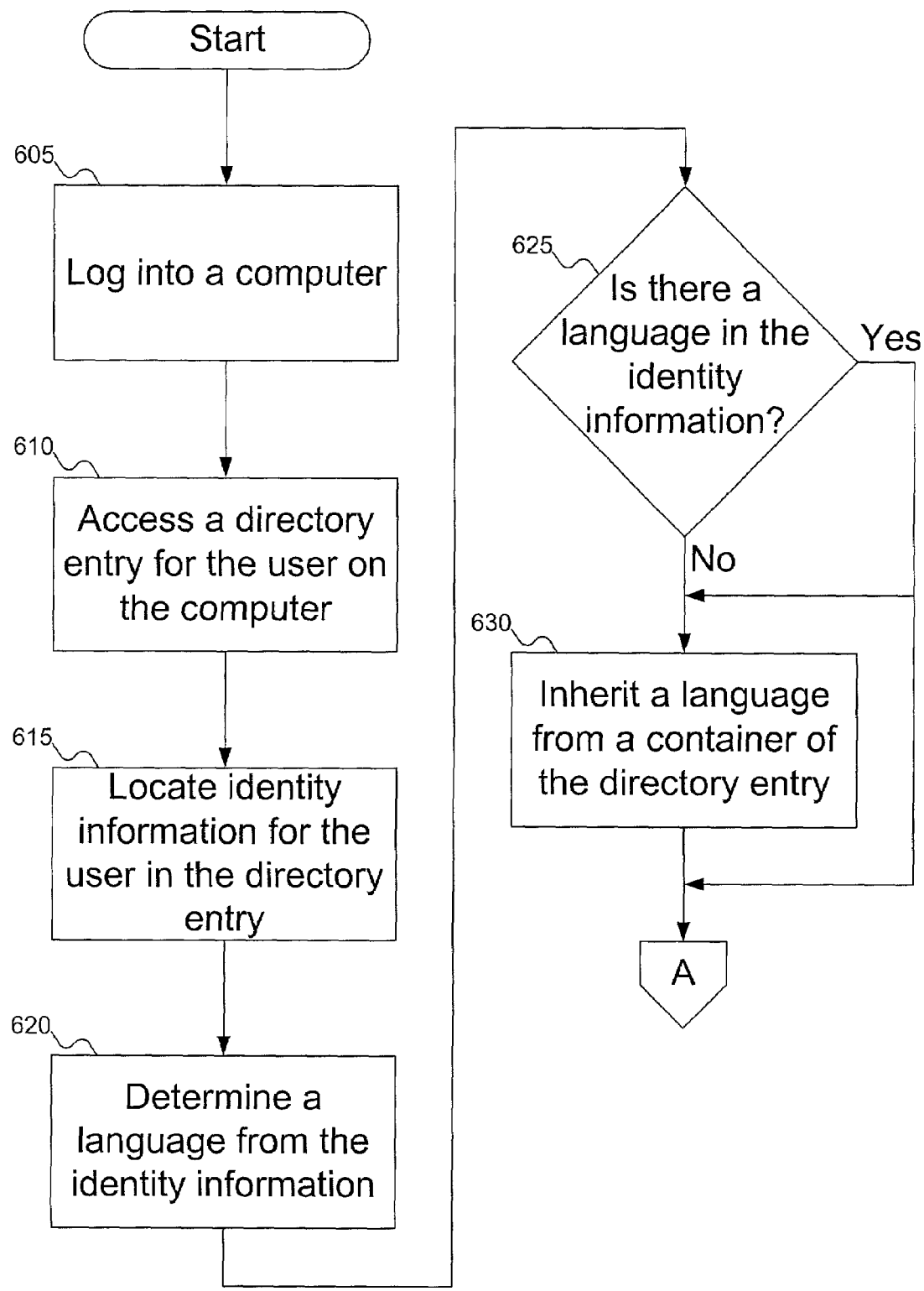
FIGS. 6A-6B a flowchart for identifying a user's preferred language on the systems of FIGS. 2-4, according to an embodiment of the invention.
Figure 6B:
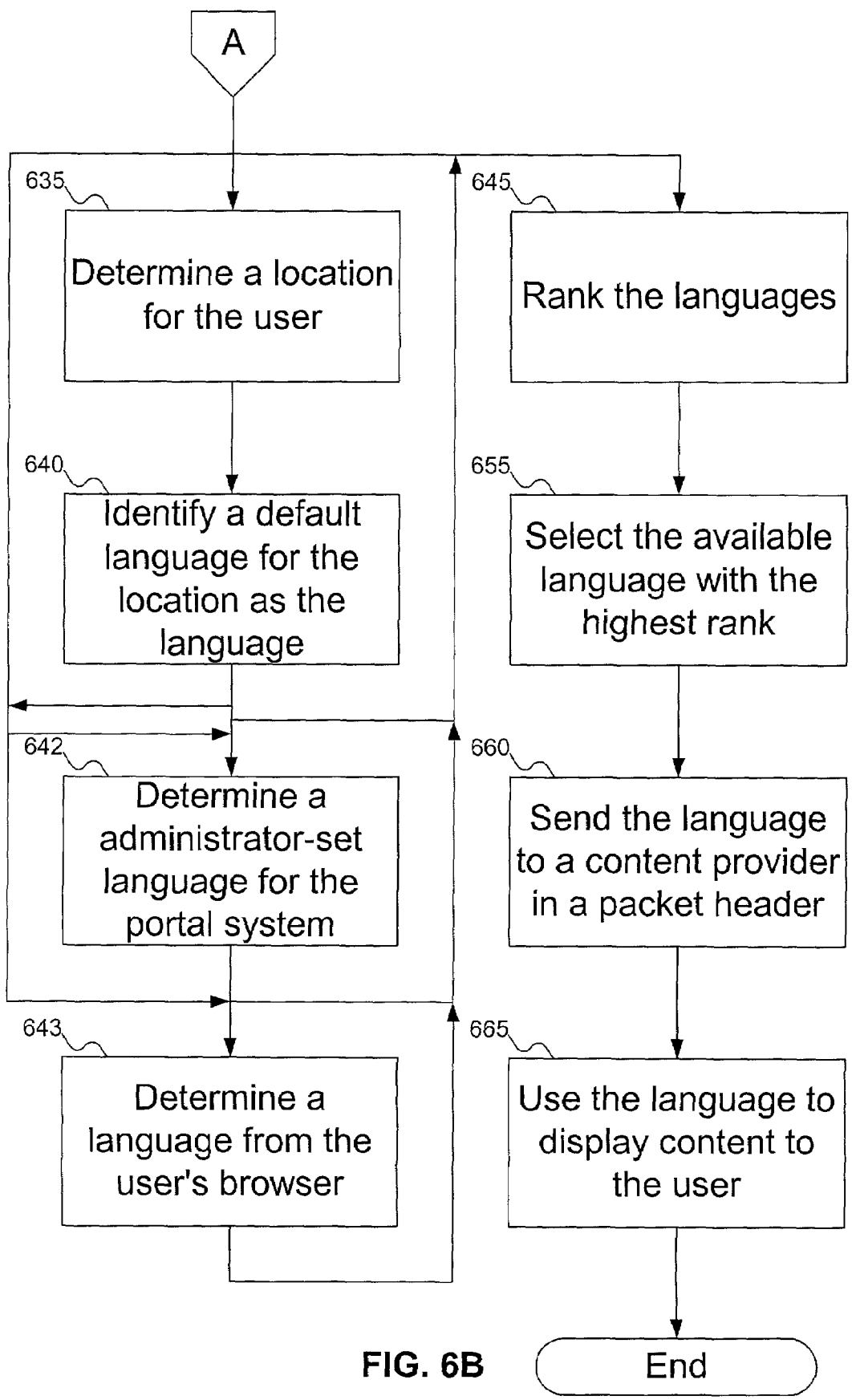

FIGS. 6A-6B show a flowchart for identifying a user's preferred language on the systems of FIGS. 2-4, according to an embodiment of the invention. At step 605 (FIG. 6A), the user logs in to a computer. At step 610, the computer accesses a directory entry for the user. At step 615, the computer locates identity information for the user within the directory entry. At step 620, the computer determines a language from the identity information. At step 625, the computer checks to see if it was able to determine a language from the identity information. If there was no language in the identity information, then at step 630 a language is inherited from a container of the directory entry. Note that even if a language was determined from the identity information, a language can be inherited from a container of the directory entry.

At step 635 (FIG. 6B), a location is determined for the user. At step 640, a default language is determined for the location of the user. At step 642, a default language for the portal system, as set by an administrator, is determined. At step 643, a language is determined from the user's browser. As shown in FIG. 6B, steps 635 and 640, step 642, and step 643 all are optional (for example, if the user has specified a preferred language in his identity information, or the user has inherited a default language from a container of his directory entry) and can be skipped. At step 645, the languages are ranked. At step 655, the language with the highest rank is selected. At step 660, the language is sent by the portal server to another content provider as part of the header of a packet of data requesting information from the other content provider. Finally, at step 665 the language is used by the content provider and the portal server to display content to the user.

A person skilled in the art will recognize that steps 655 and 660 can be performed in either order, depending on the embodiment of the invention. For example, one embodiment described above has one language selected for display of all content presented to the user. In that case, steps 655 and 660 can be reversed, so that the preferred language is selected, and only that language sent to the content provider.

A person skilled in the art will recognize that an embodiment of the invention described above can be implemented using a computer. In that case, the method is embodied as instructions that comprise a program. The program can be stored on computer-readable media, such as floppy disks, optical disks (such as compact discs), or fixed disks (such as hard drives). The program can then be executed on a computer to implement the method. A person skilled in the art will also recognize that an embodiment of the invention described above can include a computer-readable modulated carrier signal.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. An apparatus for determining a language for a user, comprising:
   a first computer;
   a directory entry for the user, the directory entry stored in the first computer and including identity information for the user;
   location information for a location of a second computer from which the first computer can be accessed;
   means for determining browser information for a browser stored on the second computer;
   a ranker for ranking a plurality of languages based on at least the directory entry, the location information, and the browser information; and
   a selector for selecting one of the plurality of languages with a highest rank.

2. An apparatus according to claim 1, wherein the identity information includes at least one of the plurality of languages.

3. An apparatus according to claim 2, wherein the identity information further includes a second language.

4. An apparatus according to claim 1, further comprising:
   a container hierarchy, the container hierarchy including at least a first container, the first container including a second container, the second container including the directory entry; and
   the second container including a default language.

5. An apparatus according to claim 4, wherein the directory entry can inherit the default language from the second container.

6. An apparatus according to claim 4, wherein:
   the first container includes a second default language; and
   the directory entry can inherit the second default language from the first container.

7. An apparatus according to claim 1, wherein the plurality of languages includes:
   a first language included in the identity information;
   a second language associated with the location information; and
   a third language included in the browser information.

8. A method for determining a preferred language for a user, comprising:
   logging the user into a first computer from a second computer with login information;
   using the login information to identify a directory entry for the user;
   determining a first language from the directory entry for the user;
   determining a second language based on a location of the user at the second computer;
   determining a third language from a browser;
   ranking the first, second, and third languages; and
   selecting a highest ranked language as the preferred language.

9. A method according to claim 8, wherein determining the first language includes determining the language from an identity information stored in the directory entry for the user.

10. A method according to claim 9, wherein logging the user into a first computer includes:
    accessing the directory entry for the user from the first computer; and
    locating the identity information in the directory entry.

11. A method according to claim 9, wherein:
    determining the first language includes determining that no language is specified in the identity information in the directory entry; and
    the method further comprises inheriting the first language from a container of the directory entry.

12. A method according to claim 8, wherein determining the second language includes:
    determining the location of the user at the second computer; and
    identifying a default language for the location of the user at the second computer as the second language.

13. A method according to claim 8, further comprising using only the preferred language to display content to the user.

14. A method according to claim 13, wherein using only the preferred language includes sending the preferred language in a packet header from the first computer to a content provider.

15. A method according to claim 8, wherein determining a first language from the directory entry for the user includes determining the first language and a fourth language from the directory entry for the user.

16. A computer-readable media containing a computer program to determine a preferred language for a user, the computer program comprising:
    logging software to log the user into a first computer from a second computer with login information;
    using software to use the login information to identify a directory entry for the user;
    identification software to identify a first language from the directory entry for the user;
    identification software to identify a second language based on a location of the user at the second computer;
    identification software to identify a third language from a browser;
    ranking software to rank the first, second, and third languages; and
    selection software to select a highest ranked language as the preferred language.

17. A computer program according to claim 16, wherein the identification software to identify a first language includes determination software to determine the first language from an identity information stored in the directory entry for the user.

18. A computer program according to claim 17, wherein the logging software includes:
    accessing software to access the directory entry for the user from the first computer; and
    location software to locate the identity information in the directory entry.

19. A computer program according to claim 17, wherein:
    the identification software to identify a first language includes determination software to determine that no language is specified in the identity information in the directory entry; and
    the computer program further comprises inheritance software to inherit the first language from a container of the directory entry.

20. A computer program according to claim 16, wherein the identification software to identify a second language includes:

determination software to determine the location of the user at the second computer; and identification software to identify a default language for the location of the user at the second computer as the second language.

21. A computer program according to claim 16, further comprising using software to use only the preferred language to display content to the user.

22. A computer program according to claim 21, wherein the using software includes sending software to send the preferred language in a packet header from the browser to a content provider.

23. A computer program according to claim 16, wherein the identification software includes identification software to identify a first language and a fourth language from the directory entry for the user.

24. A computer program according to claim 16, wherein the computer-readable media is drawn from a set consisting of floppy disks, optical disks, and fixed disks.

* * * * *